(12) United States Patent
Hartmann et al.

(10) Patent No.: US 6,893,377 B2
(45) Date of Patent: May 17, 2005

(54) METHOD AND APPARATUS FOR CONTROLLING A DRIVE UNIT WITH AN INTERNAL COMBUSTION ENGINE

(75) Inventors: Dirk Hartmann, Stuttgart (DE); Horst Wagner, Stuttgart (DE); Juergen Biester, Boeblingen (DE); Thomas Glasstetter, Oberderdingen (DE); Ruprecht Anz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 10/655,470

(22) Filed: Sep. 4, 2003

(65) Prior Publication Data
US 2004/0077458 A1 Apr. 22, 2004

(30) Foreign Application Priority Data
Oct. 21, 2002 (DE) .......................................... 102 49 098

(51) Int. Cl.⁷ ............................................... B60K 41/04
(52) U.S. Cl. ........................................ 477/109; 123/352
(58) Field of Search .......................... 477/109; 123/350, 123/352; 701/103, 111

(56) References Cited

U.S. PATENT DOCUMENTS

| | | | | | |
|---|---|---|---|---|---|
| 5,660,157 A | * | 8/1997 | Minowa et al. | ............. | 123/344 |
| 6,623,401 B2 | * | 9/2003 | Idogawa et al. | ............. | 477/54 |

* cited by examiner

Primary Examiner—Dirk Wright
(74) Attorney, Agent, or Firm—Michael J. Striker (57) ABSTRACT

The method and apparatus (130) control a drive unit (30) with an internal combustion engine (35), so that changes of an output variable of the drive unit (3) during load change are limited. The method includes formulating a desired behavior of the output variable for the load change; changing the desired behavior of the output variable by changing an air supply of the internal combustion engine and forming at least a first preliminary value for adjusting the output variable by filtering the desired behavior according to an inertia of an air system for the air supply of the internal combustion engine.

14 Claims, 5 Drawing Sheets

METHOD AND APPARATUS FOR CONTROLLING A DRIVE UNIT WITH AN INTERNAL COMBUSTION ENGINE

BACKGROUND OF THE INVENTION

The present invention relates to a method for controlling a drive unit equipped with an internal combustion engine, with which the change of an output variable of the drive unit for a load change is limited and in which a desired course for the output variable of the drive unit for the load change is formed and the desired course of the output variable is converted by changing the air input to the internal combustion engine. The present invention also relates to an apparatus for controlling a drive unit with an internal combustion engine, which includes a limiting device for limiting a change of an output variable of the drive unit for a load change, a formulating device for forming a desired course for the output variable for the load change and a conversion device for changing the desired course for the output variable by changing the air intake of the internal combustion engine.

In order to avoid impacts in the drive train of a vehicle powered by an internal combustion engine during load change, i.e. during the zero passage of the coupling torque, the change of the coupling torque must be limited. The air intake system of the Otto engine has inertia during uniform operation, which can be described to good approximately as $PT_1$ behavior. A preliminary value is derived from an adjustment curve for adjusting an actual value of the coupling torque by means of an air intake of the internal combustion engine according to an actual value of the coupling torque, the motor speed and the drive train gear ratio. The limitation during a positive load change, i.e. a transition from thrust or pushing operation to pulling operation, is accomplished by an ignition angle engagement. This preliminary value is applied with the help of characteristic curves depending on the actual value of the coupling torque, the motor speed and the drive train gear ratio. In this way a rapid build up of the actual value of the coupling torque is possible after zero passage of the coupling torque.

During a negative load change during shifting from pulling operation to thrust or pushing operation a changed target value for the coupling torque is filtered by both the adjusting curve for air intake of the internal combustion engine and a so-called crank shaft adjusting curve under the influence of ignition angle and/or fuel injected into the internal combustion engine by means of $PT_1$ component. An ignition angle engagement is triggered in order to speed up the decrease in the actual value of the coupling torque.

SUMMARY OF THE INVENTION

It is an object of the present invention to provide an improved method for controlling a drive unit with an internal combustion engine, in which changes of an output variable of the drive unit for a load change of the drive unit are limited.

It is also an object of the present invention to provide an improved apparatus for controlling a drive unit with an internal combustion engine, by which changes of an output variable of the drive unit for a load change of the drive unit are limited.

According to the invention, as expressed in the main independent method claim below, the method comprises the steps of:

a) building up a desired behavior of the output variable for the load change;

b) changing the desired behavior of the output variable by changing an air supply of the internal combustion engine; and c) forming at least a first preliminary value for adjusting the output variable by filtering the desired behavior according to an inertia of an air system for the air supply of the internal combustion engine.

In this way the formation of a preliminary value for adjustment of the output variable is considerably simplified and requires less effort. The formation of the first preliminary value is determined by the inertia of the air system and thus the motor physics of the internal combustion engine.

Advantageously the desired course or behavior for the output variable results without more on changing the first preliminary value for adjusting the output variable based on the inertia of the air system.

Advantageous further embodiments and improvements of the method claimed in the main independent claim are set forth in the appended dependent claims and described below.

It is especially advantageous when the filtering of the desired behavior is performed using a $PDT_1$ component. In this way the inertia of the air system for forming the first preliminary value may be significantly considered, since this inertia has a $PT_1$ behavior to a good approximation, which acts inversely to the $PDT_1$ behavior of the filtering.

An additional advantage is attained when a target value set by the load change is at least partially exceeded magnitude-wise (which means according to the absolute values) by the first preliminary value. In this way the adjustment of the target value for the output variable may occur especially rapidly after the end of the limiting of the change in the output variable.

A further advantage results when at least one second preliminary value is set up, which the first preliminary value exceeds at least temporarily magnitude-wise, for adjustment of the output variable during the load change. In this way the change of the target value for the output variable is similarly achieved more rapidly, if necessary using an ignition angle engagement, in order to limit the actual value for the output variable to the desired behavior.

An additional advantage results when the second preliminary value is activated depending on a difference between a target value set by the load change and the desired course or behavior of the output variable. In this way the second preliminary value is activated according to need for a more rapid change of the target value for the coupling torque.

A further advantage results when the second preliminary value is formed according to a difference between a target value set by the load change and the desired course or behavior of the output variable. In this way the second preliminary value is activated according to need for a more rapid change of the target value for the coupling torque.

It is especially advantageous when the limit for the change of the output variable is changed by an ignition angle engagement, when an actual value for the output variable exceeds a desired value determined by the desired behavior of the output torque magnitude-wise or according to the absolute values. In this way impacts or jerks during load change may be reliably avoided.

An additional advantage results when the ignition angle engagement is eliminated, as soon as the limit for the change of the output variable is eliminated. In this way the limit for the change of the output variable remains limited to the region or range of the load variable and the target value for the output variable can be changed as rapidly as possible outside the range of the load variable.

It is especially advantageous when each preliminary value is respectively limited so that the output variable does not exceed magnitude-wise the target value set during load change. In this way an error free operation of the drive unit is guaranteed and bucking which impairs driver comfort is avoided in the case of a motor vehicle.

It is also advantageous according to a preferred embodiment when an actual value for the output variable exceeds a desired value for the desired course for the output variable by a predetermined threshold value when an ignition angle engagement is performed during a negative load change. In this way it is guaranteed that the change of the target value for the output variable is not unnecessarily delayed, also during a negative load change.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
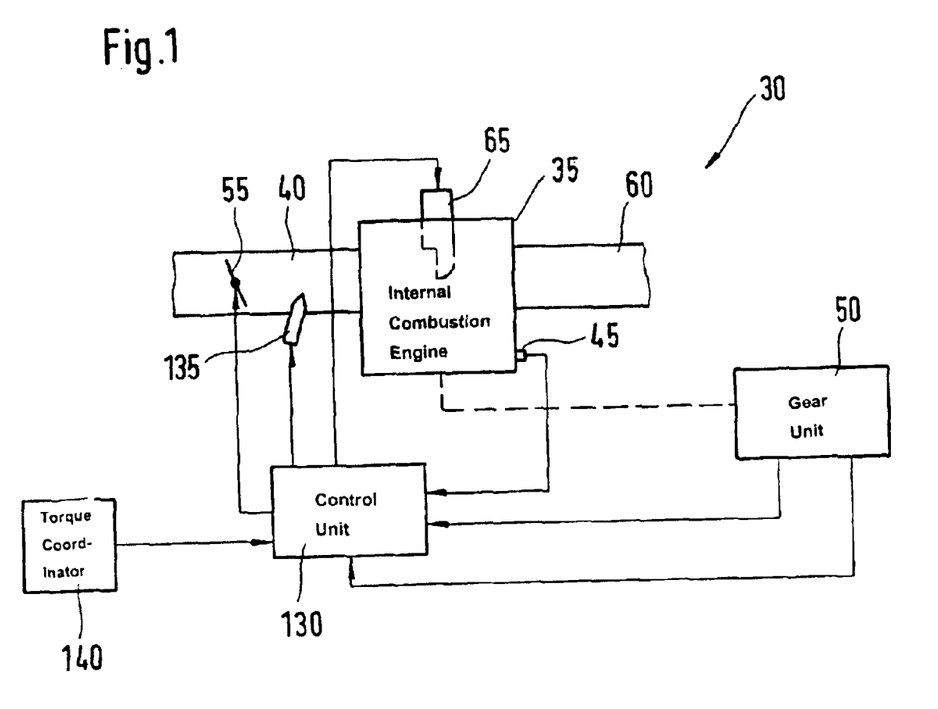
FIG. 1 is a block diagram of a drive unit according to the invention equipped with an internal combustion engine.

In FIG. 1 a drive unit 30, for example a motor vehicle, is shown. The drive unit 30 is equipped with an internal combustion engine 35, for example an Otto engine. The internal combustion engine 35 together with gears 50 forms a drive train. The internal combustion engine 35 can, for example, drive the drive wheels of a motor vehicle by means of the gears 50. The gears have different conversion ratios depending on the shifting stage and/or according to the present process. This unit cooperates with an apparatus 130, which controls the drive unit 30 and is designated in the following by "motor control unit". In at least one cylinder of the internal combustion engine 35 not shown in FIG. 1 a fuel-air mixture found in the combustion chamber of the cylinder is ignited by a spark plug 65, in order to drive the piston in the cylinder. Air is supplied to the combustion chamber of the cylinder by means of a throttle valve 55 and an air intake system 40, for example an intake pipe. Fuel is supplied to the combustion chamber of the cylinder either directly by means of an injection valve 135 or indirectly, as shown in FIG. 1, through the intake pipe 40. The exhaust gas arising in the combustion chamber during combustion of the air/fuel mixture is conducted away by means of an exhaust gas train 60. The motor speed produced by the at least one piston is acquired by a rotation sensor 45 of the internal combustion engine 35 and input into the motor control unit 130. An output variable of the drive unit 30, for example, is an output torque or output power or an output variable derived from one of these variables. In the following, for example, the output torque is considered to be the output variable of the drive unit 30. In this example a coupling torque of the gear unit 50, also the torque, is applied to the clutch or coupling of the gear unit 50 by the internal combustion engine. The coupling torque depends on the filling of at least one cylinder of the internal combustion engine 35 and on the air supply to the internal combustion engine. An actual value of this coupling torque is supplied to the motor control unit 130. The motor control unit 130 is again supplied with a set value for the coupling torque by a torque or moment coordinator 140. The torque coordinator 140 forms this set value from the torque requirements of different components, for example in the sense of a maximum choice. If the drive unit is the drive unit of a vehicle, the different components can include, for example a travel speed controller, an electronic accelerator, an anti-slip controller and an anti-lock braking system. The torque coordinator 140 then gives the set value for the coupling torque to the motor control unit 130, which is derived from the maximum torque requirements of the different components present. For example, the driver desired torque is obtained from the electronic accelerator. In order to change the set value of the coupling torque the motor control unit 130 can suitably control the air supply via the position of the throttle valve 55, the injected amount of fuel via the injection timing and/or the injection duration of the injection valve 135 and/or the timing of the ignition by the spark plug 65.

Figure 2:
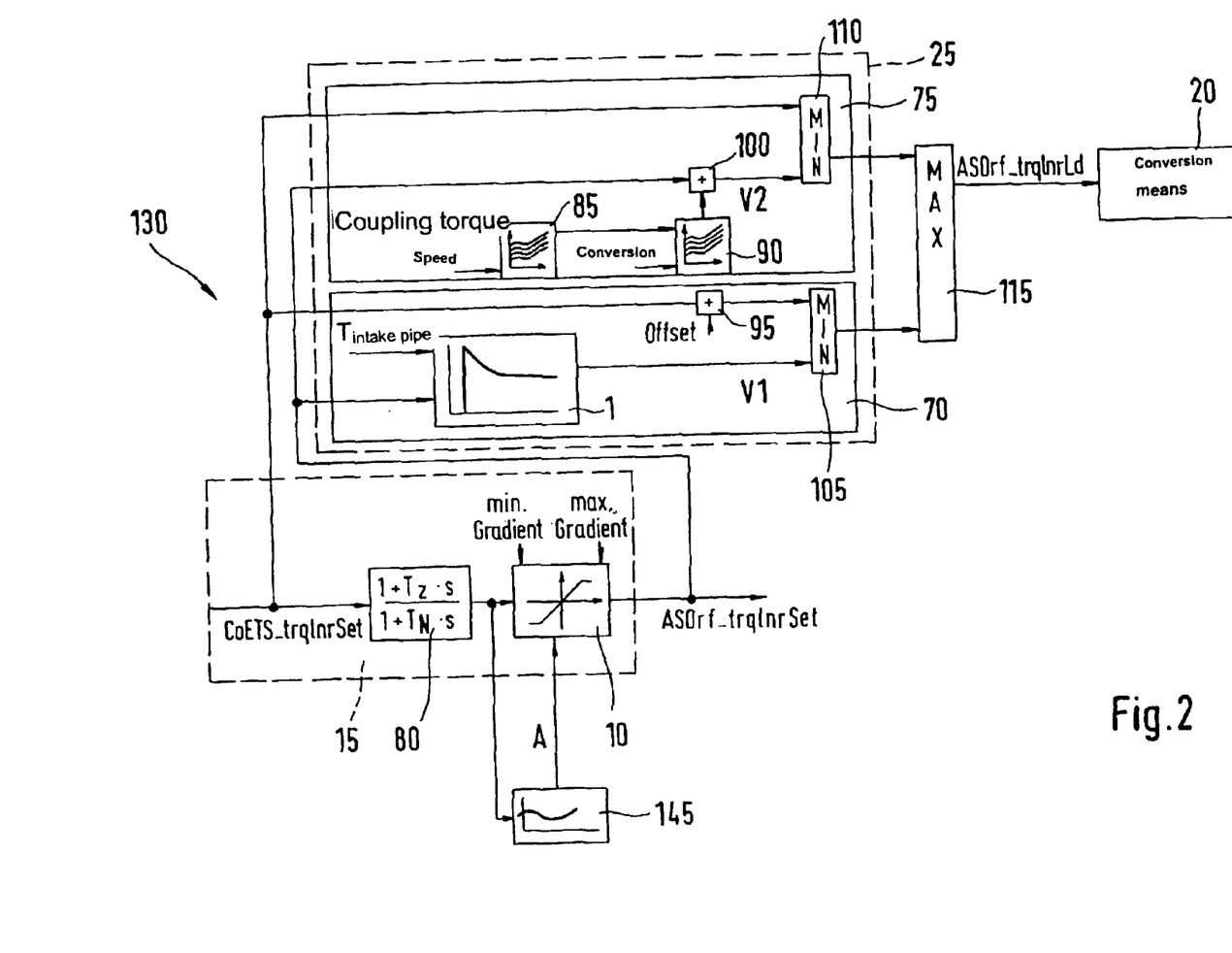
FIG. 2 is an operations diagram for illustration of the apparatus according to the invention and process according to the invention in the case of a first embodiment of the invention.

FIG. 2 shows an operations diagram for an exemplary structure of the motor control unit 130 according to a first embodiment of the invention and also the method according to the invention. The torque coordinator 140 generates a target value, CoETS_trqlnrSet, for the coupling torque and supplies it to the processing means 15 of the motor control unit. The processing means 15 includes a first $PDT_1$ component (P=proportional, D=differential, T=time). The conversion function $f$ of the first $PDT_1$ component 80 is shown in FIG. 2 and given as the following formula (1):

$$f = \frac{1 + T_Z * s}{1 + T_N * s} \tag{1}$$

The $T_Z$ and $T_N$ parameters of the first $PDT_1$ component 80 are time constants and s is the complex Laplace variable. The first $PDT_1$ component 80 is a low-pass filter for the target value, CoETS_trqlnrSet, with the purpose of avoiding fluctuations of the drive train of the drive unit 30 due to discontinuities in the target value for the coupling torque and thus bucking of the drive unit 30. Also the time constants $T_Z$ and $T_N$ are suitably applied to a test curve. The target value, CoETS_trqlnrSet, filtered by the $PDT_1$ component is subsequently supplied to a limiting means 10, which limits the change of the filtered target value for the coupling torque in the vicinity of the zero passage of the target value. A minimum allowed gradient and a maximum allowed gradient of the coupling torque are fed to the limiting means 10. The minimum allowed gradient and the maximum allowed gradient can be stored in the motor control unit 30 or the associated memory device. In the vicinity of the zero passage of the target value for the coupling torque the transient change of the coupling moment is limited by the limiting means 10 to a range between the minimum allowed gradient and the maximum allowed gradient. In this way a set value, ASDrf_trqlnrSet, is available at the output of the limiting means 10. In the vicinity of the zero passage of the target value this set value is limited to a range between the minimum allowed gradient and the maximum allowed gradient. During a zero passage and thus a load change, a change of the set value, ASDrf_trqlnrSet, for the coupling torque thus does not lead to load impacts that impair comfort of the driver of the drive unit. The region around the zero passage of the filtered target value for the coupling torque, in which the described change limitation is performed by the limiting means 10, can similarly be applied on a test curve, in order to reliably prevent a load impact during a load change. The limiting means 10 is activated by the motor control unit 130 to limit the change of the filtered target value, when the filtered target value is in the range around the zero passage of the coupling moment according to the test curve. This activation can take place with the help of an activation signal A of the motor control unit 130. This activation signal A is formed with a comparison means 145 according to the filtered target value for the coupling torque. If the filtered target value is in the applicable region around the zero passage of the coupling torque, the comparison means 145 produces an activation signal for activation of the limiting means 10, otherwise the limiting means 10 remains deactivated.

Figure 3:
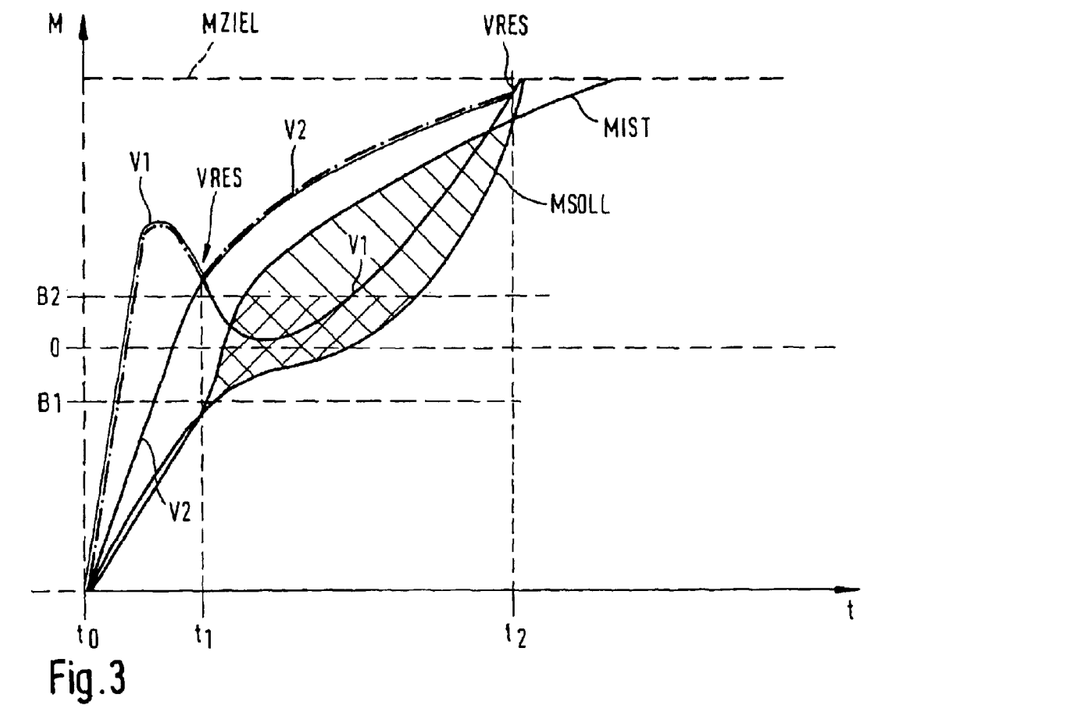
FIG. 3 is a graphical illustration of the behavior of torque with time according to the first embodiment of the invention in a first mode of operation.

A graphical illustration of the dependence of torque on time, i.e. a torque-time diagram, is shown in FIG. 3. In this figure the behavior of the target value, CoETS_trqlnrSet, is shown with a dashed line MZIEL. The target value MZIEL leads to a jump from a negative value to a positive value at time $t=t_0$, so that a shift from thrust or push operation to pulling operation of the drive unit 30 occurs. The set value, ASDrf_trqlnrSet, for the coupling torque formed by the first $PDT_1$ component 80 and the limiting means 10 of the processor means 15 is designated by MSOLL in FIG. 3. In FIG. 3 it can be seen that the increase of the set value MSOLL is limited in the vicinity of this zero passage of the set value MSOLL. The applicable region for limiting the set value MSOLL of the coupling torque in FIG. 3 is shown with the lower boundary B1<0 and the upper boundary B2>0.

Suitable adjustment or change of the air intake to the internal combustion engine 35 should change the set value MSOLL. The intake pipe 40 acting as air system of the internal combustion engine 35 has certain inertia, which is expressed in different air intake pipe time constants, $T_{intake\ pipe}$, according to the operating state of the internal combustion engine depending on the motor speed and the load. Thus, for example, at higher motor speed the air intake pipe time constant, $T_{intake\ pipe}$, is less than at lower motor speed. To good approximation the air system 40 has a $PT_1$ behavior (P=proportional, T=time). The $PT_1$ behavior of the air intake pipe 40 can be compensated by a first preliminary value V1, which results from the set value MSOLL by $PDT_1$ filtration. The set value MSOLL=ASDrf_trqlnrSet is input to a second $PDT_1$ component 1. This second $PDT_1$ component 1 is part of the means 70 for forming the first preliminary value V1. The means 70 for forming the first preliminary value is a part of the means 25. So that the second $PDT_1$ component can compensate for the $PT_1$ behavior of the intake pipe 40, the air intake pipe time constant, $T_{intake\ pipe}$, must be input into it. The air intake pipe time constant, $T_{intake\ pipe}$, can be stored for this purpose in a characteristic diagram of the motor control unit 130 for any operating point of the internal combustion engine 35. The air intake pipe time constant, $T_{intake\ pipe}$, is calculated from an air intake pipe model in a manner known to one skilled in the art depending on the actual motor speed, the actual gear ratio and the actual value MIST of the coupling torque and thus the operating point of the drive unit 30. Thus the first preliminary value V1 is the output of the second $PDT_1$ component 1, which is similarly shown in FIG. 3. When the first preliminary value V1 is changed by suitable control of the air intake of the internal combustion engine 35, thus an actual value MIST for the coupling torque results according to the torque-time diagram in FIG. 4, which is slowed relative to the first preliminary value V1 to a good approximation according to the $PT_1$-behavior. Its behavior substantially corresponds to the behavior of the set value MSOLL and/or is limited according to the methods described above to this set value MSOLL. At a second time point $t_2$ the first preliminary value V1 reaches the target value MZIEL, so that subsequently the first preliminary value V1 is itself limited by the target value MZIEL according to FIGS. 3 and 4. Subsequently the actual value MIST is guided according to the target value MZIEL delayed to a good approximation by the $PT_1$ behavior and thus deviates from the set value MSOLL. It no longer follows the preliminary estimate V1. The continuation of the set value MSOLL from the second time point $t_2$ is shown with a dashed line in FIG. 4.

Figure 4:
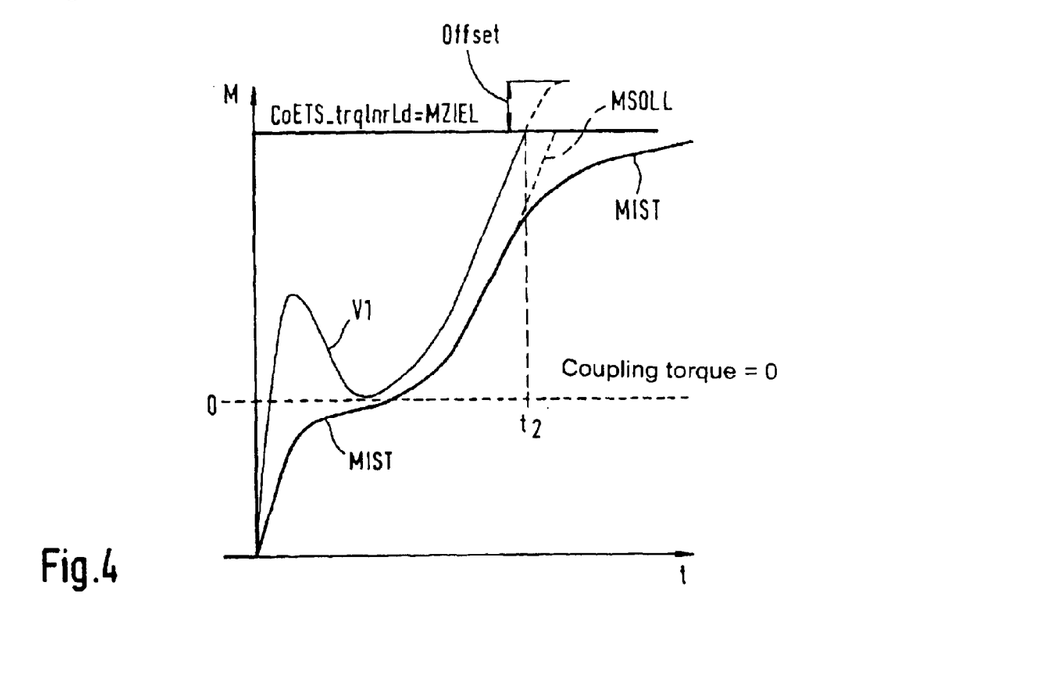
FIG. 4 is a graphical illustration of the behavior of torque with time according to the first embodiment of the invention in a second mode of operation.

In an alternative embodiment of the invention the first preliminary value V1 may pass beyond the target value MZIEL at the second time point $t_2$, as shown with the dashed line in FIG. 4. This has the consequence that the actual value MIST at the second time point $t_2$ is not limited by the target value MZIEL. However it follows the first preliminary value V1 delayed to a good approximation according to the $PT_1$ behavior and thus its behavior can correspond to the behavior of the set value MSOLL until it achieves the target value MZIEL.

The first preliminary value V1 should exceed the target value MZIEL by no more than the predetermined offset. This offset is selected so that the actual value MIST cannot exceed the target value MZIEL in order to avoid an undesired increase of the coupling torque. According to the operations diagram according to FIG. 2 the described operation is realized so that the target value, CoETS_trqlnrSet, is combined with the offset by means of a first adder 95. The result of the addition is fed to a first minimum selector 105, to which the first preliminary value V1 is input as an additional input variable. The first minimum selector 105 selects the minimum from the output of the first adder 95 and the first preliminary value V1 and delivers it for conversion by means of a suitable adjustment of the air intake to the internal combustion engine 35.

It can also be provided that the means 25 for preliminary value formation includes the means 75 for forming a second preliminary value V2. The means 75 for forming the second preliminary value V2 includes a second adder 100. The set value, ASDrf_trqlnrSet, and the output of a second characteristic diagram 90 are input to the second adder 100. The output of the second characteristic diagram 90 represents a torque offset. It is determined from the second characteristic diagram 90 depending on the actual gear ratio and the output variable of a first characteristic diagram 85. The output variable of the first characteristic diagram is formed depending on the actual value of the coupling torque and the actual motor speed. The characteristic diagrams 85,90 for example can be applied at a test bench or test stand, in order to obtain the desired torque offset from the output of the second characteristic diagram 90. The torque offset can be applied by suitable data from the characteristic diagrams 85,90 depending on the actual value for the coupling torque, the actual motor speed and the actual gear ratio. The dynamic behavior of the drive unit 30 and thus the vehicle described in the example is taken into account by the actual motor speed and the actual gear ratio. The actual motor speed effects the air intake pipe time constant, $T_{intake\ pipe}$, and thus the dynamics of the air system 40. The greater the motor speed, the less the air intake pipe time constant, $T_{intake\ pipe}$. The actual gear ratio effects the dynamics of the drive unit 30. The lower the set movement, the greater the gear ratio and the dynamics of the drive unit. The higher the set movement of the gear unit 50, the smaller is the change and thus the dynamics of the drive unit 30. The offset torque is formed now, starting from the actual value of the coupling torque considering the dynamic behavior of the drive unit 30 based on the actual motor speed and the actual gear ratio. Thus the offset torque is greater, the more the coupling torque approaches the zero passage value and vice versa. That means that it is less the further the coupling torque is from the zero passage value. The torque offset is thus positive. Thus the second preliminary value V2 of the coupling torque at the output of the first adder 100 is greater than the set value MSOLL. Also or alternatively it can be provided that the offset torque and thus the second preliminary value V2 is formed according to the difference between the target value MZIEL set during the load change and the set value MSOLL and thus according to the desired behavior of the output variable. For example, the torque offset is formed according to this difference so that the torque offset increases when the difference between the target value MZIEL and the set value MSOLL approaches the target value MZIEL and thus the set value MSOLL approaches zero. On the other hand the torque offset is smaller when the different between the target value MZIEL and the set value MSOLL moves to larger values from the target value MZIEL. This may be seen from a comparison of the course of the target value MZIEL, the set value MSOLL and the second preliminary value V2 in FIG. 3.

It can be provided that the second preliminary value V2 is formed either during the entire load change according to FIG. 3 or only temporarily. It is decisive that the second preliminary value V2 is only used then as a preliminary parameter for adjustment of the actual value MIST of the coupling torque, when it exceeds the first preliminary value V1. This is the case according to FIG. 3 from time point $t_1$ to time point $t_2$. In the intervening time interval the actual value MIST of the coupling torque follows the second preliminary value V2 to good approximation according to the $PT_1$ behavior. Also this results in the actual value MIST from time point $t_1$ to the time point $t_2$ exceeding the set value MSOLL, as shown in FIG. 3. Thus a resulting preliminary parameter VRES, which is present from the time point $t_0$, at which the target value jumps to MZIEL, to the time point $t_1$ is formed by the first preliminary value V1, because in this time interval the first preliminary value V1 is larger than the second preliminary value V2. From the time point $t_1$ to the time point $t_2$ the second preliminary value V2 is greater than the first preliminary value V1 and the resulting VRES is formed by the second preliminary value V2. From the time point $t_2$ the first preliminary value V1 is greater than the second preliminary value V2 and the resulting preliminary parameter VRES is formed by the first preliminary value V1. According to the operations diagram of FIG. 2 the formation of the resulting preliminary parameter VRES occurs with the help of the maximum value selector 115. The output of the first minimum value selector 105 and the output of the second minimum value selector 110 are input to this maximum value selector 115. The target value, CoETS_ trqlnrSet, for limiting the second preliminary value V2 and the second preliminary value V2 are input to the second minimum value selector 110. Thus the second preliminary value V2 is limited magnitude-wise to a maximum value, which is formed in this example by the target value, CoETS_trqlnrSet, so that a magnitude-wise overshoot of the target value, MZIEL=CoETS_trqlnrSet, for the coupling torque adjusted by the load change is prevented. The output of the first maximum value selector 115 thus is the resulting preliminary parameter VRES, whereby the actual value MIST of the coupling torque then follows the resulting preliminary parameter VRES to a good approximation with the $PT_1$ behavior. For the example shown in FIG. 3 it can be seen that the offset added in the first adder 95 is equal to zero so that the resulting preliminary parameter VRES is also limited according to the target value MZIEL at the time point $t_2$.

As described the second preliminary value V2 can be formed alternatively also only temporarily. For example it can be provided that the means 75 for forming the second preliminary value V2 is activated according to a difference between the target value MZIEL adjusted by the load change and the set value MSOLL and thus the desired course of the coupling torque. For example a first threshold value can be set up. When the difference between the target value MZIEL and the set value MSOLL falls below the first threshold value magnitude-wise, the means 75 for forming the second preliminary value V2 can be activated. Furthermore a second threshold value can be set up. When the difference between the target value MZIEL and the set value MSOLL falls below this second threshold value magnitude-wise, the means 75 for forming the second preliminary value V2 can again be deactivated, so that the second threshold value is selected to be less than the first threshold value. Both threshold values should be set up so that it is reliably guaranteed that the means 75 for forming the second preliminary value V2 can then be activated, when the second preliminary value V2 is greater than the first preliminary value V1, also between the time point $t_1$ and the time point $t_2$, according to the example in FIG. 3. The threshold values can be set up for different jumps or discontinuous changes of the target value MZIEL. In this way the formation of the second preliminary value is accomplished with little application effort, since the second preliminary value then does not need to be formed, when the resulting preliminary parameter VRES is not formed.

Also the second preliminary value V2 can be limited in the means 75 to a target value corrected by an offset by means of the second minimum value selector 110, as was described for the means 70 using the first adder 95.

As described the actual value MIST for the coupling torque is above the set value MSOLL between the time point $t_1$ and the time point $t_2$ according to FIG. 3. The shaded region between the actual value MIST and the set value MSOLL between the time point $t_1$ and the time point $t_2$ is shown in FIG. 3. That means that the actual value MIST is not limited by the set value MSOLL between the time point $t_1$ and the time point $t_2$, so that the desired load impact attenuation would not be guaranteed in this time interval. Therefore the limitation of the change of the actual value MIST for the coupling torque between the time point $t_1$ and the time point $t_2$ occurs by an ignition angle engagement. The ignition effectiveness is degraded by the motor control unit 130 in order to achieve the desired limitation of the actual value MIST of the coupling torque. This can occur by suitable adjustment of the ignition time point so that it deviations from the optimum ignition time point for efficient ignition. In this way the actual value MIST for the coupling torque between the time point $t_1$ and the time point $t_2$ is again limited to the set value MSOLL curve. Since above all limitation of the change in coupling torque is required between torque values B1 and B2 to attenuate load impacts, the ignition angle activation for actual values MIST<B1 and MIST>B2 can be eliminated. An ignition angle engagement can also be eliminated when the limitation of the change in the coupling torque is dispensed with, also when the actual value MIST for the coupling torque exceeds the value B2. The elimination of the ignition angle engagement should occur continuously, for example by means of a ramp function, in order to avoid an additional jump in the coupling torque. Ignition angle engagement limited to the torque region between the values B1 and B2 is shown by the double shading in FIG. 3.

By using the second preliminary value V2 in the region of decreasing first preliminary value V1, i.e. also between the time point $t_1$ and the time point $t_2$ according to the example in FIG. 3, the advantage is achieved that the actual value MIST reaches the target value MZIEL more rapidly than it would when the first preliminary value V1 is used alone according to FIG. 4 and without the use of the offset added in the first adder 95. The omitted limitation of the change of the actual value MIST for the coupling torque between the time point $t_1$ and the time point $t_2$ must then be made by an ignition angle engagement, at least in the region between the values B1 and B2.

Figure 5:
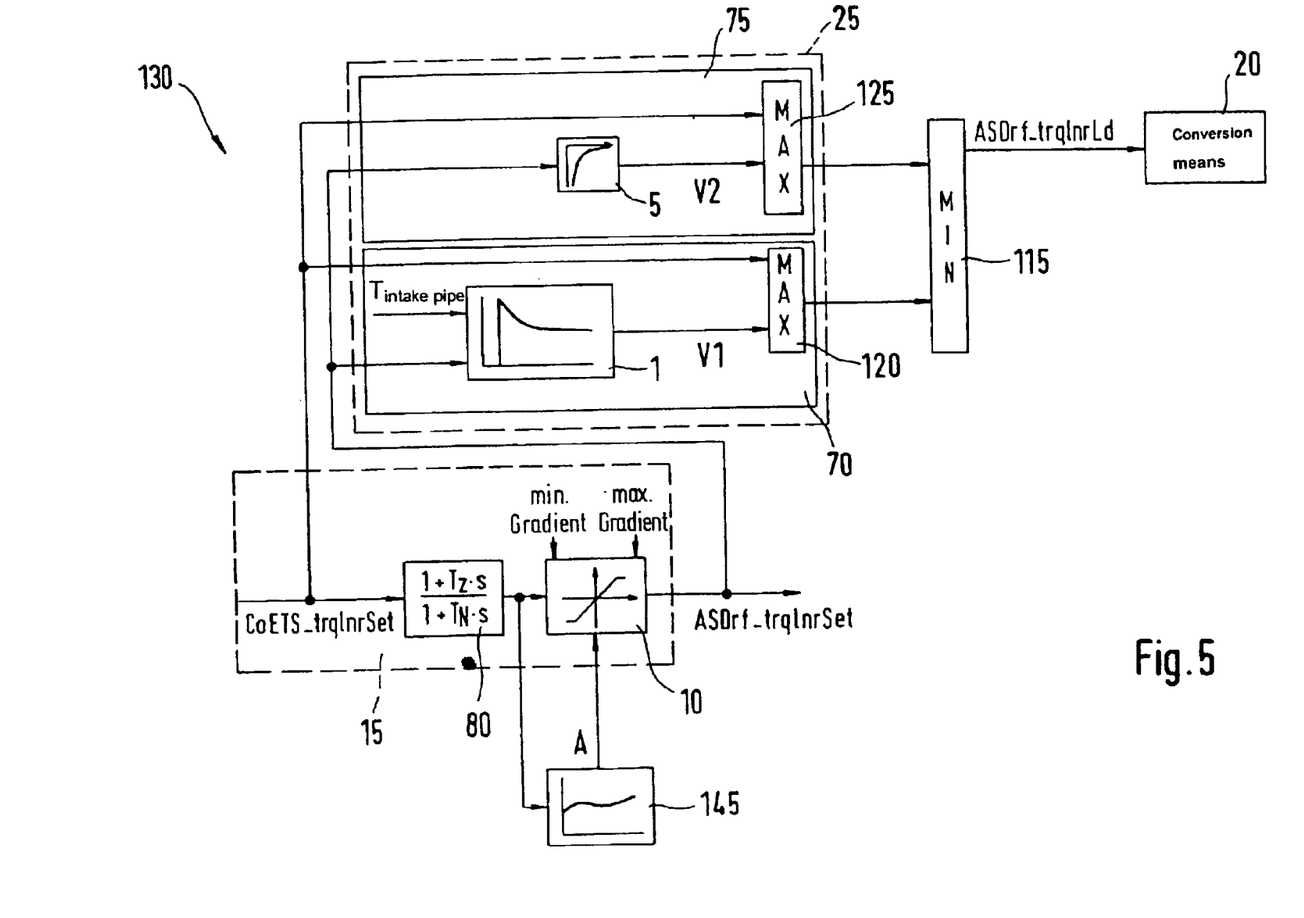
FIG. 5 is an operations diagram for illustration of the apparatus according to the invention and the process according to the invention in the case of a second embodiment of the invention.

FIG. 5 shows an operations diagram for a second embodiment of the apparatus and method according to the invention. The elements that are the same as elements in FIG. 2 are given the same reference numbers as in FIG. 2. The second embodiment according to FIG. 5 is for the case of a negative load change from pulling operation to pushing or thrust operation of the drive unit 30. The means 70 for formation of the first preliminary value V1 does not have the possibility in the embodiment shown in FIG. 5 (in contrast to the embodiment of FIG. 2) to add an offset to the set value, ASDrf_trqlnrSet, for limitation of the first preliminary value. Alternatively it could be provided that this offset was negative in this case in order to perform a limitation of the first preliminary value V1 downward. Furthermore a second maximum value selector 120 is required in the position of the first minimum value selector 105 in the embodiment of FIG. 2 in the case of a negative load change. The first preliminary value V1 and the set value, ASDrf_trqlnrSet, are input to the second maximum value selector 120, so that the first preliminary value V1 limited by the set value, ASDrf_trqlnrSet, is output from the second maximum value selector 120. The means 25 for preliminary value formation in this second embodiment according to FIG. 5 thus only include the means 70 for formation of the first preliminary value V1 using the already described second $PDT_1$ component 1 (FIG. 2).

Additionally the means 25 for preliminary value formation also can include the means 75 for formation of the second preliminary value V2 in the second embodiment shown in FIG. 5. The structure of the means 75 for formation of the second preliminary value differs however from that shown in FIG. 2. In the second embodiment according to FIG. 5 the means 75 for formation of the second preliminary value V2, to which the set value, ASDrf_trqlnrSet is input, includes a $PT_1$ component 5. It is set up so that its time constants, for example, depend on the actual motor speed and the actual gear ratio. The $PT_1$ component 5 filters the set value, ASDrf_trqlnrSet, according to the dynamics of the vehicle behavior and outputs the second preliminary value V2. The second preliminary value V2 is fed to a third maximum value selector 125, to which the target value, CoETS_trqlnrSet, is also input. The second preliminary value V2 limited as needed by the target value, CoETS_trqlnrSet, is thus available at the output of the third maximum value selector 125. The outputs of the second maximum value selector 120 and the third maximum value selector 125 are input to a third minimum value selector 115, which selects the minimum of both input variables and outputs the resulting preliminary value, ASDrf_trqlnrLd, to the coversion means 20 for control of the throttle 55. Thus in the second embodiment according to FIG. 5 the resulting preliminary value VRES=ASDrf_trqlnrLd is formed so that it corresponds to either the first preliminary value V1 or the second preliminary value V2, according to which ever is the smaller.

Because both the first preliminary value V1 and the second preliminary value V2 is formed by filtering in the second embodiment according to FIG. 5, the application expense is considerably reduced in the second embodiment according to FIG. 5.

Figure 6:
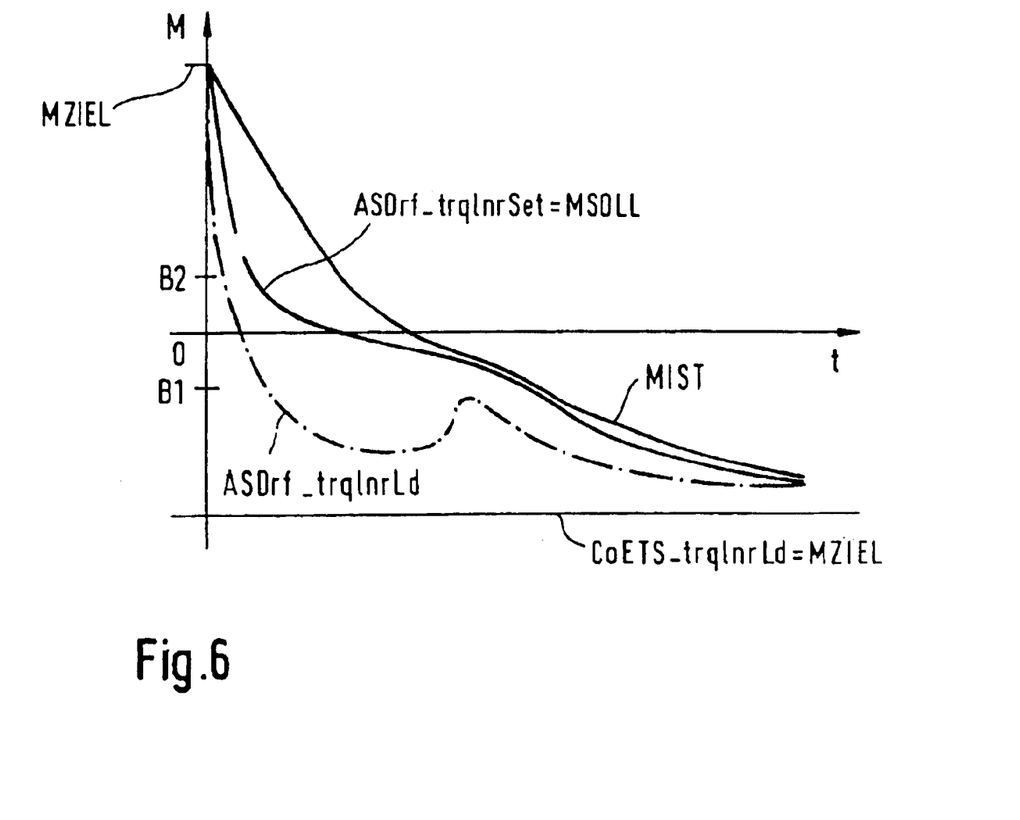
FIG. 6 is a graphical illustration of the behavior of torque with time according to the second embodiment of the invention.

In FIG. 6 an example of a torque-time diagram for a negative load change is shown, which occurs by a jump or discontinuously change of the target value, CoETS_trqlnrLd, from a positive torque value to a negative torque value, so that the torque moment experiences a zero passage, i.e. passes through 0. The desired value or target value, CoETS_trqlnrLd=MZIEL, for the coupling torque is changed by the processing means 15, as described into the set value, MSOLL=ASDrf_trqlnrSet, which is limited in its increase in the region of the zero passage. In the example according to FIG. 6 the means 25 for preliminary value formation includes only the means 70 for formation of the first preliminary value V1. The first preliminary value V1 thus corresponds to the resulting preliminary value, ASDrf_trqlnrLd=VRES. It is derived from the set value MSOLL by $PDT_1$ filtering with the help of the section $PDT_1$ component 1 with the air intake pipe time constant, $T_{intake\ pipe}$, and is shown with the dot-dashed curve in FIG. 6, which is between the target value MZIEL and the set value MSOLL. The resulting preliminary value ASDrf_trqlnrLd is input to the conversion means 20 for controlling the throttle 55. The actual value MIST of the coupling torque then follows the resulting preliminary value, ASDrf_trqlnrLd, based on the inertia of the intake pipe 40 to good approximation with a $PT_1$ behavior, whose time constant is the air intake pipe time constant, $T_{intake\ pipe}$. The air intake pipe time constant, $T_{intake\ pipe}$, depends, as described above, especially on the actual motor speed. Since the first preliminary value V1 and thus the resulting preliminary value VRES for the coupling torque is derived from the set value MSOLL, thus also the actual value MIST for the coupling torque is limited down by the set value MSOLL, as shown in FIG. 6. This is as described since the $PDT_1$ filtering with the air intake pipe time constant, $T_{intake\ pipe}$, substantially compensates or balances the inertia of the intake pipe 40, which is characterized to a good approximation by the $PDT_1$ filtering with the air intake pipe time constant, $T_{intake\ pipe}$. The $PDT_1$ filtering through the second $PDT_1$ component 1 with the the $PDT_1$ filtering with the air intake pipe time constant, $T_{intake\ pipe}$, is also the inverse of the $PT_1$ behavior of the air intake pipe 40 with the air intake pipe time constant, $T_{intake\ pipe}$.

Also during a negative load change an ignition angle activation can be performed in order to impair the ignition effectiveness or efficiency and so that the actual value MIST approximates the target value MZIEL more quickly, assuming that the change of the actual value MIST around the zero passage of the coupling torque remains limited to the change of the set value MSOLL at least in the region defined by the values B1 and B2, in order to attenuate or reduce the load impacts. The ignition angle engagement can then be activated in a negative load change, when the actual value MIST for the coupling torque exceeds the set value MSOLL (and thus the desired course for the coupling torque) by more than a predetermined threshold value. The predetermined threshold value can thus be set up so that a too slow approach of the actual value MIST to the target value MZIEL is reliably prevented.

When the actual value MIST of the coupling torque is used for setting up or applying the second preliminary value V2 according to the first embodiment shown in FIG. 2, as a criteria for activating the ignition angle engagement or for calculation of the air intake pipe time constant, $T_{intake\ pipe}$, also a predicted actual value of the coupling torque can be derived, which results from one or more foregoing measured actual values for the coupling torque, for example with the help of an extrapolation.

In both embodiments an ignition angle engagement or activation can be dropped or dispensed with when only the first preliminary value V1 is used as the resulting preliminary value VRES, since in this way it is guaranteed that the actual value MIST is limited by the set value MSOLL formed, so that the magnitude of the actual value MIST does not exceed magnitude-wise that of the set value MSOLL.

The control of the throttle 55 occurs by means of the conversion means 20 so that the more the throttle is opened, the greater the resulting preliminary value VRES is. Similarly the lesser the throttle 55 is opened, the lesser is the resulting preliminary value VRES.

The present invention is useable for all drive units, which allow change of the coupling torque by changing the so-called air path, also by control of the air intake to the internal combustion engine 35, for example by means of the throttle 55. Additionally or alternatively to a sometimes required ignition angle engagement, also the fuel injected amount and/or the injection time point can be varied in order to obtain and/or, in the case of a negative load change, to guarantee a more rapid approach of the actual value MIST of the coupling torque to the target value MZIEL. Thus the invention is suitable for drive units with Otto engines or diesel motors, in as much as the air supply is adjustable in the described manner for the desired change of the coupling torque. With the Otto motor the coupling torque may be limited in its change additionally by ignition angle activation or engagement and/or by change of the fuel injection amount and/or the fuel injection time point. In the diesel motor the coupling torque can by changed only by change of the fuel injection amount. The same goes for the described accelerated approach of the actual value MIST of the coupling torque to the target value MZIEL in the case of the negative load change.

The disclosure in German Patent Application 102 49 098.8 of Oct. 21, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for controlling a drive unit equipped with an internal combustion engine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for controlling a drive unit (30) with an internal combustion engine (35), in which changes of an output variable of the drive unit for a load change of the drive unit are limited, said method comprises the steps of:
   a) formulating a desired behavior of the output variable for the load change;
   b) changing the desired behavior of the output variable by changing an air supply of the internal combustion engine; and
   c) forming at least a first preliminary value for adjusting the output variable by filtering the desired behavior according to an inertia of an air system for the air supply of the internal combustion engine.

2. The method as defined in claim 1, wherein said filtering is performed using a $PDT_1$ component.

3. The method as defined in claim 1, wherein a target value of the output variable set by the load change is at least temporarily magnitude-wise exceeded by the first preliminary value.

4. The method as defined in claim 1, further comprising forming a second preliminary value for adjustment of the output variable for the load change, which at least temporarily exceeds magnitude-wise the first preliminary value.

5. The method as defined in claim 4, wherein said second preliminary value is formed according to a coupling torque, a motor speed and a gear ratio.

6. The method as defined in claim 4, wherein said second preliminary value is activated according to a difference between a target value set by the load change and the desired behavior for the output variable.

7. The method as defined in claim 4, wherein said second preliminary value is formed according to a difference between a target value set by the load change and the desired behavior for the output variable.

8. The method as defined in claim 1, wherein a limit for the changes of the output variable is changed additionally by an ignition angle engagement, when an actual value for the output variable exceeds a desired value according to the desired behavior of the output variable magnitude-wise in operation.

9. The method as defined in claim 8, wherein said ignition angle engagement is canceled, when the limit for the changes of the output variable is canceled.

10. The method as defined in claim 1, wherein each preliminary value is limited to a maximum amount magnitude-wise so that an actual value for the output variable is prevented from exceeding a target value set by the load change.

11. The method as defined in claim 1, further comprising performing an ignition angle engagement during a negative load change, when an actual value for the output variable exceeds a desired value determined by the desired behavior of the output variable by more than a predetermined threshold value.

12. The method as defined in claim 4, further comprising forming said second preliminary value by filtering the desired behavior for the output variable during a negative load change.

13. The method as defined in claim 12, wherein the filtering is performed using a $PT_1$ component.

14. An apparatus (130) for controlling a drive unit (3) with an internal combustion engine (35), said apparatus comprising limiting means (10) for limiting changes of an output variable of the drive unit (30) for a load change;

formulation means (15) for deriving a desired course or behavior for said output variable for the load change;

conversion means (20) for changing the desired course or behavior for said output variable by changing an air supply for the internal combustion engine; and means (25) for forming at least a first preliminary variable for adjusting the output variable by filtering the desired course or behavior of the output variable depending on an inertia of an air system for air supply for the internal combustion engine (35).

* * * * *